United States Patent Office 3,469,413
Patented Sept. 30, 1969

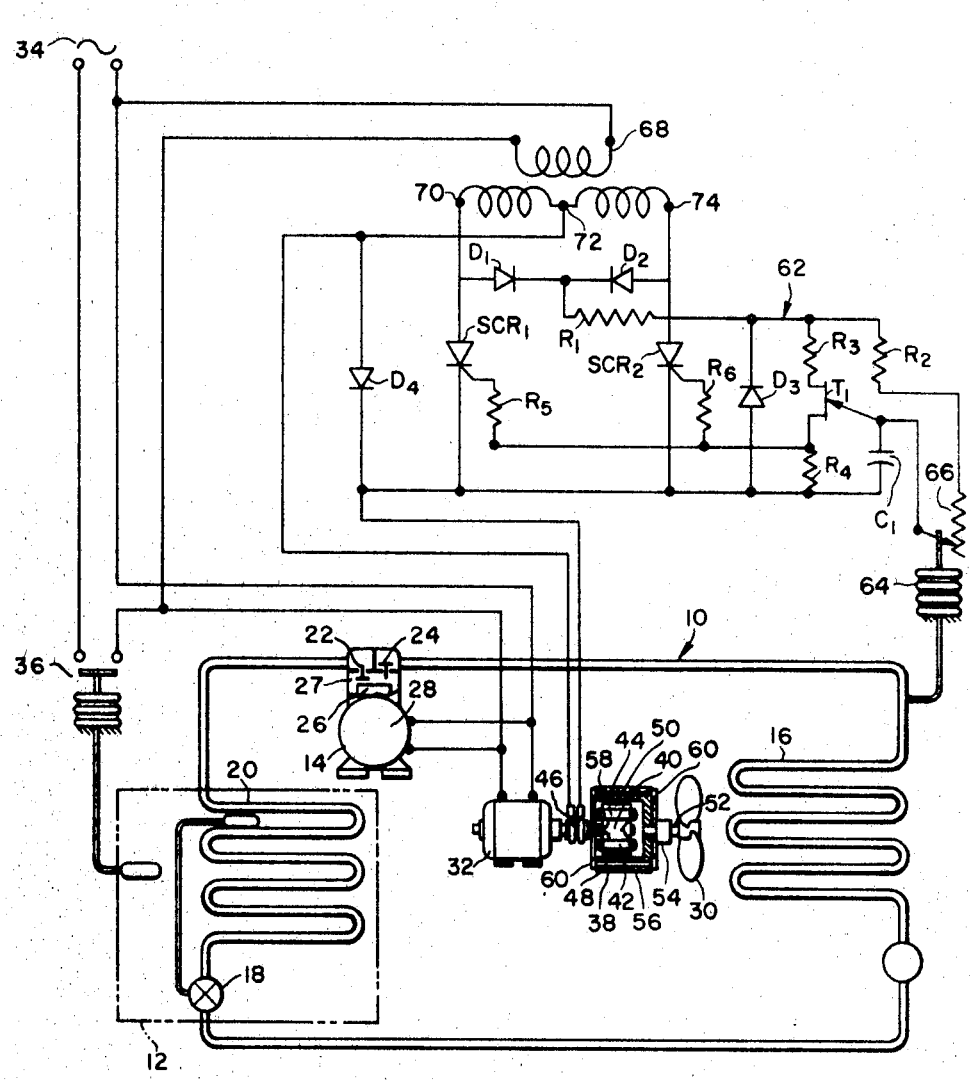

3,469,413
REFRIGERANT APPARATUS CONTROL
Robert G. Miner, La Crosse, Wis., assignor to The Trane Company, La Crosse, Wis., a corporation of Wisconsin
Filed Dec. 27, 1967, Ser. No. 693,814
Int. Cl. F25b 39/04
U.S. Cl. 62—184                                          10 Claims

ABSTRACT OF THE DISCLOSURE

A vapor compression system having a condenser fan which is variably magnetically coupled to a motor for varying the condenser fan speed wherein the magnetic intensity of the coupling is varied in response to an electric control signal derived in response to variations in refrigerant pressure at the high pressure side of the system.

Background of the invention

In the art of compression cycle refrigeration systems having air cooled condensers, it is known to control the condenser fan speed for the purpose of maintaining a predetermined minimum pressure at the refrigerant throttling means despite variations in cooling air temperature and/or load on the condenser. Such condenser fan speed controls have taken several different forms. One scheme of control involves the use of a two speed fan motor which may be cycled from one discrete speed to another discrete speed as required. Such a system usually requires a switching mechanism for changing the number of active poles in the motor. While this scheme has found widespread use, it will be appreciated that it does not maintain the condenser pressure accurately because the control is by stages rather than by modulation. Further, because of the rather complicated switching requirements, this control is costly.

Modulated condenser fan speed controls have been known for a number of years. These have the distinct advantage of more accurate control of condenser pressure. One form of such control involves the use of a condenser temperature responsive variable resistance in series with the fan motor. This control has the disadvantage of considerable power loss at the resistor. More recently various condenser fan speed controls have been suggested which utilize a solid state switch caused to conduct only during a portion of each half cycle of the alternating current power source, the speed variation being obtained by varying the timing of that instant in each half cycle at which the solid state switch begins to conduct in response to a condition of the refrigerant. These controls are finding increasing use in small refrigeration systems such as for residential applications. Such systems when properly designed are extremely versatile and produce fast and accurate control. Unfortunately, the cost of such controls increase materially with the size of the system to which it is applied. This is because the full motor current is carried by the control circuit.

The instant invention enables the versatility and accuracy of the above mentioned solid state condenser fan speed control systems to be applied economically to larger refrigeration condensers.

This invention involves refrigerant compressor, an air cooled refrigerant condenser, refrigerant throttling means, and a refrigerant evaporator serially connected in a closed refrigerant circuit; that portion of said circuit between said compressor through said condenser to said throttling means being the high pressure side of the refrigerant circuit; a fan for passing cooling air over said condenser; a motor; a driver member arranged to be rotated by said motor; a driven member arranged to rotate said fan; magnetomotive means drivingly connecting said driver member to said driven member; and means for varying the magnetic intensity of said magnetomotive means in accordance with a condition of the refrigerant in said high pressure side.

Other objects and advantages will become apparent as this specification proceeds to describe the invention in detail with reference to the drawing, the single figure of which discloses schematically one embodiment of my invention.

Referring to the drawing, there is shown a refrigeration system 10 for cooling a conditioned space 12. Refrigeration system 10 includes a reciprocating refrigerant compressor 14, an air cooled refrigerant condenser 16, a refrigerant throttling means such as temperature responsive expansion valve 18, and refrigerant evaporator 20 respectively serially connected in a closed refrigerant loop or circuit. Compressor 14 includes a suction valve 22 for receiving refrigerant gas from evaporator 20 and a discharge valve 24 for discharging compressed refrigerant gas to condenser 16. Compressor 14 also includes a piston 26 for compressing refrigerant in a compression cylinder 27 communicating with valves 22 and 24. Piston 26 is reciprocally driven by electric motor 28.

Condenser cooling fan 30 is arranged to pass cooling air over condenser 16 and is driven by relatively constant speed electric motor 32. Compressor motor 28 and fan motor 32 are connected to an alternating current power source 34 via a thermostatic switch 36 responsive to the temperature of conditioned space 12.

Fan motor 32 is drivingly connected to fan 30 through an eddy current coupling 38. Coupling 38 includes an electro-magnetic core 40 mounted for rotation with the drive shaft of motor 32. Wound about core 40 are coils 42 and 44 which when connected to a source of direct current power through slip rings 46 establish north and south magnetic poles 48 and 50 respectively. Fan 30 is connected at one end of fan shaft 52 which is rotatably mounted in bearing 54. Mounted for rotation with shaft 52 is the hub of an eddy current coupling inductor drum 56 which drum concentrically overlies the faces of poles 48 and 50.

The cylindrical portion of drum 56 may be formed of magnetic material such as iron or steel. Embedded within the cylindrical portion are a plurality of axially extending arcuately spaced current conducting bars 58 the adjacent ends of which are interconnected by a pair of current conducting end rings 60. The rotation of magnetic poles 48 and 50 relative to bars 58 induces a current in bars 58 establishing a magnetic field which opposes relative movement between core 40 and drum 56. While not shown, it will be appreciated that the drum 56 may be constructed with laminated magnetic material if desired in lieu of the solid iron or steel construction shown.

The direct current supplied to slip rings 46 is derived from a solid control network 62. This current is varied by control network 62 in response to the refrigerant pressure in the high pressure side of the refrigeration system via of pressure transducer 64.

Circuit 62 and the operation thereof may be explained as part of the operation of the refrigeration system.

Operation

As the temperature in conditionad space 12 rises to a predetermined temperature, thermostatic switch 36 closes whereby fan motor 32 and compressor motor 28 are energized and the piston 26 of compressor 14 is caused to reciprocate in the cylinder 27.

On downward strokes of piston 26, refrigerant gas is drawn from evaporator 20 through suction valve 22 into cylinder 27. Upon the upward strokes of piston 26, the refrigerant gas is compressed and discharged by way of discharge valve 24 to condenser 16.

As the refrigerant pressure in the high side of the system increases, the bellows of transducer 64 which communicates with the high pressure side reduces the value of resistance 66 of control network 62 thereby increasing the current delivered by the control network 62 to coils 42 and 44 and thus the magnetic intensity at poles 48 and 50. This increased magnetic intensity reduces the slip between core 40 and drum 56 thereby increasing the speed of fan 30 relative to the speed of motor 32.

Control network 62 includes a step down transformer 68 having primary winding connected to the power source through thermostatic switch 36. Transformer 68 has a center tap secondary winding with end terminals 70 and 74 and center terminal 72.

The power portion of the control network 62 includes a circuit extending from terminals 70 and 74 through silicon controlled rectifiers $SCR_1$ and $SCR_2$, one of slip rings 46, coils 42 and 44, the other of slip rings 46, to power source 32. Silicon controlled rectifiers $SCR_1$ and $SCR_2$ are arranged to conduct during opposite half cycles so that coils 42 and 44 are provided with a pulsating direct current. The amount of current delivered coils 42 and 44 is determined by the period of time that $SCR_1$ and $SCR_2$ are conducting. This is varied by varying the instant in each half cycle at when the SCR is triggered.

For this purpose network 62 has a trigger circuit. During the first portion of each half cycle a circuit is made from one of terminals 70 and 74, through one of diodes $D_1$ and $D_2$, through current limiting resistor $R_1$, through Zener diode $D_3$, through coils 42 and 44 to center tap terminal 72. Zener diode $D_3$ establishes a predetermined voltage across its terminals as well as across the series circuit of Resistor $R_2$, variable resistance 66 and capacitor $C_1$. The rate at which $C_1$ is charged is a function of the resistance 66 controlled by the refrigerant pressure in the high side. The voltage at $C_1$ increases to a predetermined voltage corresponding to the threshold voltage of unijunction transistor $T_1$ at which instant the emitter thereof, being connected to the capacitor $C_1$, causes the unijunction transistor $T_1$ to conduct thereby establishing a circuit through resistors $R_3$ and $R_4$ which then establishes a voltage across $R_4$. This establishes a voltage across an anode and cathode of each of $SCR_1$ and $SCR_2$ via of current limiting resistors $R_5$ and $R_6$ respectively causing one of the controlled rectifiers to conduct for the remainder of the half cycle. Of course, the other controlled rectifier similarly conducts during the next half cycle. It will thus be appreciated that resistance 66 controls the period of each half cycle during which the controlled rectifiers conduct and thus the current to coils 42 and 44. As the refrigerant pressure increases, the magnetic intensity of coupling 38 increases thus increasing the condenser fan speed. As the refrigerant pressure decreases, the magnetic intensity of the coupling decreases, thus decreasing the fan speed. Free wheeling diode D4 provides an electrical path for the current caused by the inductive effect of coils 42 and 44 during the instant $SCR_1$ and $SCR_2$ are not conducting to prevent the imposition of excessive voltages on the circuit which might cause damage to the solid state elements.

If the temperature of the cooling air and the load on the condenser are such that the fan, when operated at full speed control to be applied economically to large refrigersirable predetermined minimum pressure, fan 30 will operate at full speed. If the refrigeration system components are properly selected, the condenser pressure will not become excessive while fan 30 is operated at full speed.

Refrigerant condensate from condenser 16 is thus supplied at or above said desirable predetermined minimum condensing pressure to expansion valve 18 whereupon it is throttled to a low pressure in evaporator 20. In this manner sufficient pressure is maintained at throttling means 18 so that it may respond accurately to meet the load on the evaporator especially when the condenser cooling temperature or condenser load is low.

It will thus be seen that the instant invention enables the versatility and accuracy of solid state condenser fan speed control to be applied economically to large refrigeraation condenser fans.

Having thus described in detail the preferred embodiment of my invention, I contemplate that many changes may be made without departing from the scope or spirit of my invention and I accordingly desire to be limited only by the following claims.

I claim:

1. A refrigerant apparatus comprising: a refrigerant compressor, an air cooled refrigerant condenser, refrigerant throttling means, and a refrigerant evaporator serially connected in a closed refrigerant circuit; that portion of said circuit between said compressor through said condenser to said throttling means being the high pressure side of the refrigerant circuit; a fan for passing cooling air over said condenser; a motor; a driver member arranged to be rotated by said motor; a driven member arranged to rotate said fan; magnetomotive means rotatably drivingly interconnecting said driver member to said driven member; and means for varying the magnetic intensity of said magnetomotive means in accordance with a condition of the refrigerant in said high pressure side.

2. The apparatus as defined by claim 1 wherein said means for varying the magnetic intensity includes a pressure-resistive transducer arranged to sense refrigerant pressure in said high pressure side.

3. The apparatus as defined by claim 1 wherein said magnetomotive means includes a coil arranged to establish magnetic polarity on one of said members when said coil is energized and the other of said members includes a plurality of closed electric paths into which electrical current is induced by relative rotation of said driver and driven members.

4. The apparatus as defined by claim 3 wherein said means for varying the magnetic intensity includes means for variably energizing said coil in accordance with a condition of the refrigerant in said high pressure side.

5. The apparatus as defined by claim 3 wherein said means for varying the magnetic intensity includes means for variably energizing said coil in response to the refrigerant pressure in said high pressure side.

6. The apparatus as defined by claim 3 including means for energizing said coil with direct current and means for varying said direct current in accordance with a condition of the refrigerant in said high pressure side.

7. The apparatus as defined by claim 3 including means for energizing said coil with direct current and means for varying said direct current in response to the refrigerant pressure in said high pressure side.

8. The apparatus as defined by claim 7 wherein said means for varying said direct current includes a pressure-resistive transducer arranged to sense the pressure of the refrigerant in said high pressure side.

9. The apparatus as defined by claim 1 wherein said magnetomotive means includes a pole winding and said means for varying the magnetic intensity of said magnetomotive means includes a first circuit serially connecting said winding to an electric power source via a gated semiconductor switch; and a second circuit for controlling the gate of said switch in response to a condition of the refrigerant in said high pressure side.

10. The apparatus as defined by claim 9 wherein said gated semiconductor switch is a silicon controlled rectifier.

References Cited

UNITED STATES PATENTS

| 1,922,508 | 8/1933 | Terry | 62—183 |
| 2,952,991 | 9/1960 | St. Pierre | 62—184 |
| 3,059,447 | 10/1962 | Brugler | 62—429 |
| 3,196,629 | 7/1965 | Wood | 62—183 |

WILLIAM J. WYE, Primary Examiner

U.S. Cl. X.R.

62—507